US006617534B2

(12) United States Patent
Goff et al.

(10) Patent No.: US 6,617,534 B2
(45) Date of Patent: Sep. 9, 2003

(54) COMBINED DETENT PLUNGER AND MOVING CONTACT

(75) Inventors: Ray C. Goff, Burnley (GB); Steven R. Hoskins, Walled Lake, MI (US); Joseph E. Khoury, Stromberg (DE); Christopher Robinson, Burnley (GB)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 09/851,031

(22) Filed: May 7, 2001

(65) Prior Publication Data

US 2002/0162731 A1 Nov. 7, 2002

(51) Int. Cl.$^7$ ................................ H01H 21/02
(52) U.S. Cl. ............... 200/61.54; 200/565; 200/567
(58) Field of Search ................ 200/61.54, 61.27, 200/564, 565, 567, 572

(56) References Cited

U.S. PATENT DOCUMENTS 3,894,207 A * 7/1975 Jelley .................... 200/567
5,701,660 A * 12/1997 Javery et al. ........... 200/61.54

* cited by examiner

Primary Examiner—Renee Luebke
(74) Attorney, Agent, or Firm—Blank Rome LLP

(57) ABSTRACT

A windshield wiper lever, wherein a single contact slide operates both as a contact element and as a detent plunger, enabling both wiper wash and wipe functions. To this end, the steering column lever comprises: (i) a hollow knob having an inner wall that defines a plurality of axially disposed detents; (ii) a first slide adapted for translational movement having a cam at one end adapted to engage one of the detents; and (iii) a substrate supporting translational movement of the first slide, the substrate having a trace adapted to engage a conductive member of a second slide to form an electrical connection, wherein one of the detents maintains the electrical connection.

17 Claims, 3 Drawing Sheets

COMBINED DETENT PLUNGER AND MOVING CONTACT

BACKGROUND OF THE INVENTION

1. Field of the Invention

The present invention relates generally to windshield wiper lever assemblies. More particularly, the present invention relates to windshield wiper lever assemblies adapted to enable the driver to initiate a windshield wash and/or a windshield wipe.

2. Discussion of the Background

Automobiles commonly provide one or more functional levers that extend outwardly from the steering column. One well known functional lever operates the turn signals. In many instances, the levers are multifunctional. For instance, an automobile manufacturer may wish to combine the turn signal lever with the head light controls, such that pivoting the turn signal lever in one plane controls the turn signals, while moving the turn signal lever in another plane toggles the headlights between normal lighting and fog lighting.

Another well known multifunctional lever controls windshield wiping and cleaning. These levers typically enable the driver to turn the front and/or rear windshield wipers on as well as to set the speed of one or both of the front and rear windshield wipers. The levers also typically enable the driver to operate the front and/or rear window wash alone or in combination with the wipers. Since, in many instances, the driver will be operating the wipers and the wash in bad driving conditions, an important feature of the windshield wiper lever is that it be fully operable with one hand and without requiring the driver to observe the lever.

Referring now to FIG. 1, a schematic sectional view illustrates that a known multifunctional wiper lever assembly 10 includes a rotating device or knob 12 that an automobile driver can manually rotate and translate. The knob 12 is manually translationally moveable along the center of the section (i.e., into or out of the page), whereby a portion of the knob 12 linearly engages a contact slide 14 and translates the slide over a printed circuit board ("PCB") 16 having conductive traces. The slide 14 has a conductive member, which touches or electrically connects to a plurality of traces of the PCB 16 to thereby initiate an automobile function.

Rotating the known wiper lever assembly 10 initiates a plurality of additional automobile functions, such as setting various wiper speed settings, via electrical connections created by a contact slide and a PCB as previously described. If the electrical connection is a maintained or latching type, i.e., does not return to a starting position upon the driver's release of the knob 12, the assembly 10 must have the ability to provide tactile feedback to the driver to inform the driver when a particular electrical connection, e.g., a particular wiper speed has been set.

Until now, the known assembly has required an additional detent plunger 18 and an additional detent spring 20. The detent spring 20 is compressed between the plunger 18 and a surface 22 that is fixed with respect to the assembly 10. The detent spring 20 thereby applies a constant compressive force to the plunger 18, so that the plunger "rides" along the dynamic profile created by the plurality of inwardly radially spaced detents 24, which are defined by an inner wall 26 of the knob 12. That is, when the driver turns the knob 12 clockwise or counterclockwise, as illustrated, the plunger 18 moves radially inward or outward along the detent profile. The driver preferably feels a tactile "click" when the plunger 18 "bottoms out" or engages the bottom or valley of one of the radially disposed detents 24, which corresponds to a simultaneous electrical connection taking place in the assembly 10, so that the driver knows that a particular function has been set.

While the known wiper lever assembly provides adequate tactile feedback to the driver, the known assembly 10 requires the additional detent plunger 18, spring 20 and radially disposed detents. The additional plunger 18 and spring 20: (i) add cost to the wiper lever; (ii) complicate the necessary design and tooling; and (iii) complicate the assembly process. Original equipment manufacturers ("OEM's") are the primary users of wiper levers. Maintaining the same functionality at even a small decrease in cost provides a substantial benefit to the OEM's. Accordingly, a need exists to provide a lower cost wiper lever.

SUMMARY OF THE INVENTION

The present invention provides an improved steering column lever assembly. More specifically, the present invention provides an improved windshield wiper lever, wherein a single contact slide operates both as a contact element and as a detent plunger, enabling both wiper wash and wipe functions.

To this end, in an embodiment of the present invention, a steering column lever comprises: (i) a hollow knob having an inner wall that defines a plurality of axially disposed detents; (ii) a first slide adapted for translational movement having a cam at one end adapted to engage one of the detents; and (iii) a substrate supporting translational movement of the first slide, the substrate having a trace adapted to engage a conductive member of a second slide to form an electrical connection, wherein one of the detents maintains the electrical connection.

In an alternative of this embodiment, the first slide includes a conductive member and the substrate includes a trace adapted to engage the conductive member of the first slide. In one alternative of this embodiment, an electrical connection between the conductive member of the first slide and its associated trace initiates a windshield wash. In another, an electrical connection between the conductive member of the first slide and its associated trace is formed by translating at least a portion of the knob.

In one alternative of this embodiment, the electrical connection created by the second slide initiates a windshield wipe. In another, the electrical connection created by the second slide is formed by rotating at least a portion of the knob.

In an alternative of this embodiment, one detent receives the cam at a different axial position than another detent. An alternative of this embodiment includes a spring contacting the knob, the spring adapted to oppose manual translational movement of the knob. In an alternative of this embodiment, a detent is a notch in the inner wall having a shape adapted to provide a predetermined resistance to rotational movement of the knob.

An alternative of this embodiment includes a spring contacting the first slide at an end opposite the cam, the spring adapted to compress the cam into the detents of the knob. In one alternative of this embodiment, the spring has a characteristic spring constant adapted to provide a predetermined resistance to rotational movement of the knob. In another, the spring is compressed upon assembly so as to provide a predetermined resistance to rotational movement of the knob. In a further, the cam has a shape adapted to provide a predetermined resistance to rotational movement of the knob.

In another embodiment of the present invention, a steering column lever comprises: (i) a hollow knob having an inner wall that defines a plurality of axially disposed detents; (ii) a first slide adapted for translational movement having a cam at one end adapted to engage one of the detents; and (iii) a substrate supporting translational movement of the first slide, the substrate having a trace adapted to engage a conductive member of a second slide to form an electrical connection, wherein one of the detents provides tactile feedback for the electrical connection.

In an alternative of this embodiment, the substrate has a plurality of traces adapted to individually engage the conductive member of the second slide to form a plurality of individual electrical connections. In another, a particular detent provides tactile feedback for one of the electrical connections. In a further, a particular electrical connection is created by rotating the knob such that the cam engages a particular detent.

In a further embodiment of the present invention, a hollow knob for engaging a cam end of a slide contained in a windshield wiper lever comprises: (i) an opening on one end of the knob for receiving the slide; and (ii) an inner wall that defines an inner radius and an outer radius of a detent ring, wherein the detent ring includes a plurality of axially disposed detents that face the opening.

In an alternative of this embodiment, a detent is a notch in the detent ring having a shape adapted to provide a predetermined resistance to rotational movement of the knob. In another, one detent receives the slide at a different axial distance than another does another detent.

An advantage of the present invention is to provide an improved windshield wiper lever assembly.

Another advantage of the present invention is to provide an improved detent structure inside the knob for engaging the contact slide.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 2:
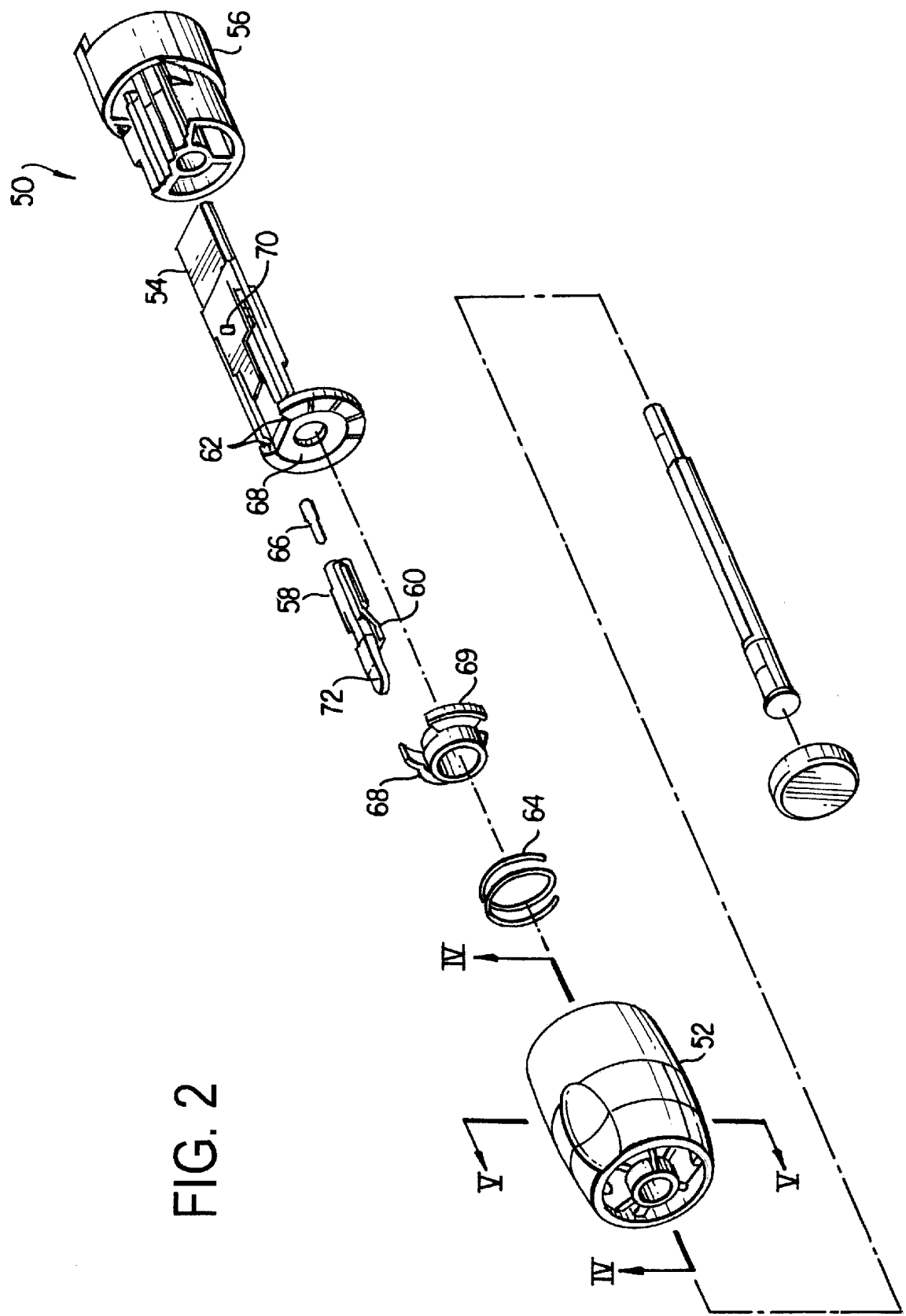
FIG. 2 is a top-front perspective exploded view of the windshield wiper lever assembly of the present invention having a combined contact slide and detent plunger.

Referring now to FIG. 2, an exploded view illustrates the windshield wiper lever assembly 50 of the present invention.

The wiper lever assembly 50 includes a knob 52, which preferably manually rotates clockwise and counterclockwise about the axis of its substantially cylindrical shape. It should be appreciated that the knob 52 includes having any desired outer shape, which is preferably ergonomically compatible with the driver's use of a single hand to operate the knob 52. That is, the knob includes having flats or other types of configurations which aid a person's fingers and hand in gripping, turning and pushing the knob 52 towards a steering column (not illustrated). The knob 52 is made of any suitable strong, light weight, preferably inexpensive and preferably non-conductive material, such as plastic or polycarbonate.

The knob 52 is also preferably manually translationally moveable along the axis of its substantially cylindrical shape towards and away from a substrate 54 and a housing 56. The housing 56 slides over the substrate 54 and mates with an inner surface of the knob 52. A contact slide 58 engages inner wall of the knob 52, as described in detail below, and slides or translates linearly in a direction parallel to the axis of the center of the cylindrical knob 52. The contact slide 58 moves or slides along the substrate 54. As described above, when the driver pushes or translates the knob 52 towards the substrate 54 and the housing 56, i.e., towards the steering column (not illustrated), the slide 58, which is constantly contacting an inner surface of the knob 52 (described below), moves the same distance as the knob 52. The maximum distance that the knob 52 and slide 58 are able to move is preferably 3 to 5 mm (0.12 to 0.20 inch).

The slide 58 of the present invention is preferably made of plastic, metal or polycarbonate. The slide 58 has a conductive member 60, which touches or electrically connects to one or a plurality of electrical contact traces 62 imbedded in the substrate 54. The conductive member 60 of the slide 58 includes one or more conductive leads that extend from the slide 58 onto the substrate 54. In one preferred embodiment, the conductive member 60 is a U-shaped copper lead wherein the legs of the U-shape extend onto the substrate 54 and are spaced apart such that they touch a plurality of traces 62, close a circuit that initiates an automobile function. The slide 58 includes having a plurality of conductive members 60 and the substrates 54 includes having a plurality of preferably copper traces 62. Imbedding traces into a substrate or PCB is well known to one skilled in the art.

When the driver pushes or translates the knob 52 and the slide 58 the maximum distance (3 to 5 mm or 0.12 to 0.20 inch) the conductive member 60 of the slide 58 preferably touches or electrically connects with the electrical contact trace 62 dedicated to the front windshield wash feature of the automobile. The electrical connection created between the conductive member 60 and the front wash contact trace 62 initiates the front windshield wash function as is well known in the art. It should be appreciated that the electrical connection created by pushing or translating the knob 52 and the slide 58 is adaptable to initiate any windshield wiper or wash function. For example, instead of initiating the front wash, the translational connection includes initiating the rear wash, turning the wipers on or off, setting the wipers to a fast wipe or a slow wipe or setting the wipers to any of the variable wipe speeds described below.

When, after pushing or translating the knob 52, the driver releases the knob 52, i.e., desires to stop the windshield wash, a knob spring 64 pushes and returns the knob 52 to its normal position. Simultaneously, a slide spring 66 pushes and maintains the slide 58 in constant contact with an inner wall of the knob 52. The knob spring 64 pushes against a fixed and stable surface 68 that is located either on a rotational contact slider 69 or on a vertical wall of the substrate 54, as is illustrated in two places in FIG. 2. The knob spring 64 contacts an inner wall or surface of the of the knob 52 as illustrated below. The slide spring 66 pushes against a fixed and stable catch 70 extending upward from the top of the substrate 54 as illustrated. The slide spring 66 contacts a portion of the slide 58 opposite to the end of the slide having a cam 72.

Figure 1:
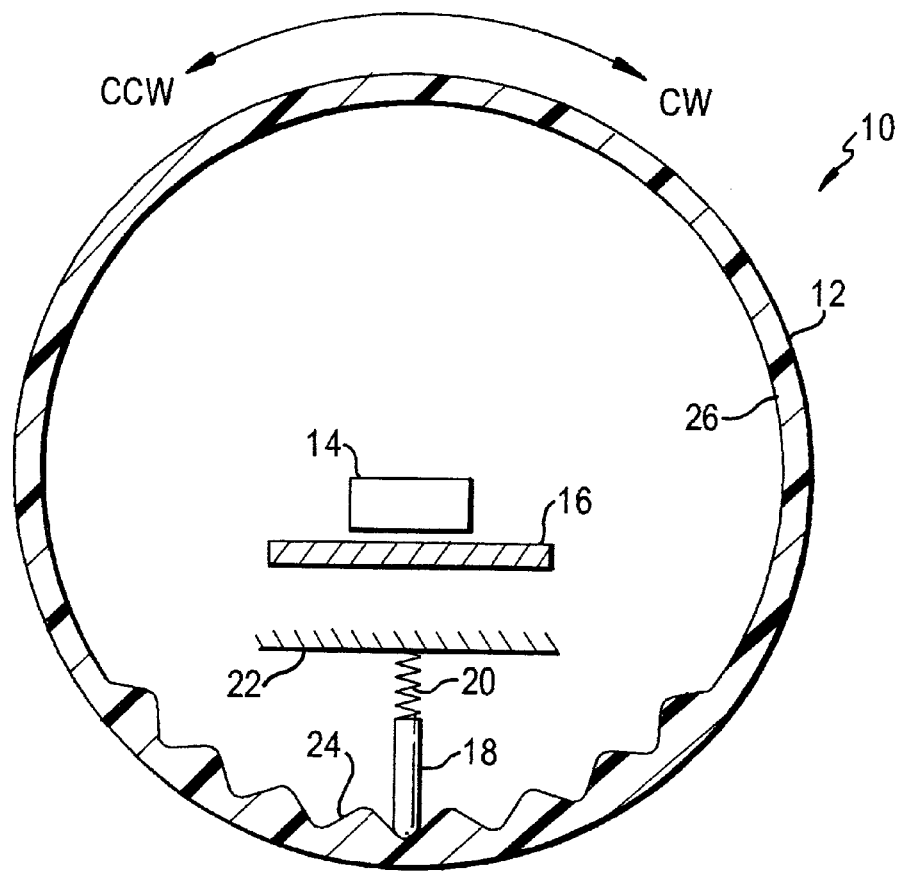
FIG. 1 is a schematic elevation sectional view taken through a known knob, illustrating known radially disposed detents in combination with a known radially disposed detent plunger.
Figure 3:
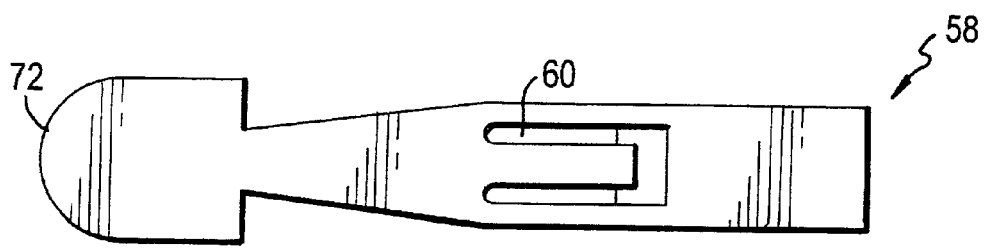
FIG. 3 is a bottom plan view of the contact slide of the present invention illustrating the slide's conductive member and its arch shaped cam.

Referring now to FIG. 3, a bottom plan view of the slide 58 illustrates the conductive member 60, illustrated as a U-shaped contact, and the cam 72. It should be appreciated that the conductive member 60 includes having any number of leads and is not limited to two, as illustrated. The cam 72, as illustrated, generally has an arch or elliptically shaped face. The cam 72 includes the arch or ellipse having any severity or angle, such as a very steep angle, wherein the arch is more pointed. The arch also includes having a dull angle or even being circular. The arch, however, preferably includes a rounded rather than a sharply pointed edge. As described in more detail below, the shape of the arch is one of the factors leading the overall tactile sensation that the driver feels as the driver rotates the knob 52 and sets different wiper speeds.

Figure 4:
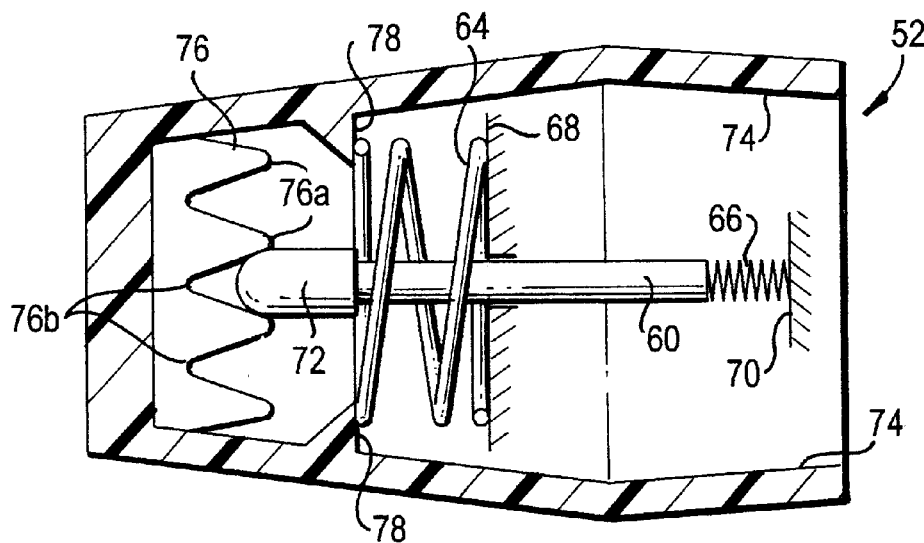
FIG. 4 is a bottom plan cross-sectional view of the knob of the present invention, taken through the line IV—IV of FIG. 2, illustrating axially disposed detents that mate with the cam portion of the combined contact slide and detent plunger.

Referring now to FIG. 4, a bottom sectional view taken through the knob 52 of the present invention illustrates that an inner wall 74 of the knob 52 defines a plurality of axially spaced apart detents 76. For illustration purposes, FIG. 4 also includes the bottom plan view of the slide 58 having the conductive member 60 and the cam 72. The cam 72 is shown engaged with one of the detents 76. The slide spring 66 is compressed between the slide 58 and the catch 70, which thereby constantly compresses the slide 58 up against the profile created by the detents 76. The knob spring 64 is compressed between a mating surface 78 integral to the inner wall 74 and the stable surface 68, e.g., on the rotational slider 69 or vertical wall of the substrate 54, which thereby returns the knob 52 to its normal position after the driver pushes or translates the knob 52 towards the stable surface 68.

Figure 5:
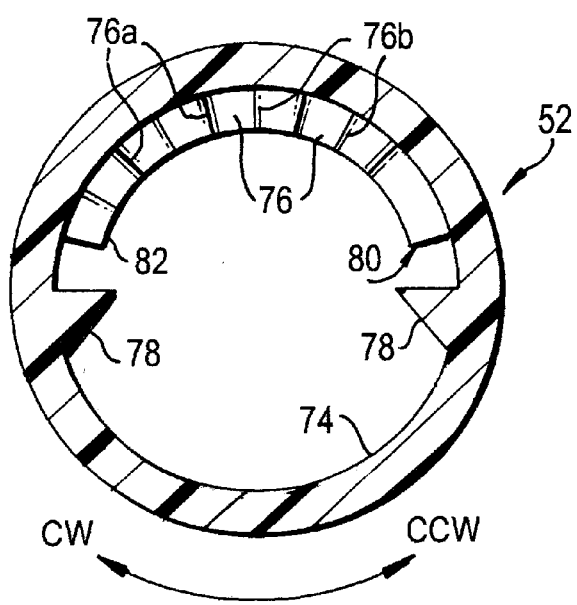
FIG. 5 is a rear end elevation cross-sectional view of the knob of the present invention, taken through the line V—V of FIG. 2, illustrating a radial ring of axially disposed detents that mate with the cam portion of the combined contact slide and detent plunger.

In FIG. 4, the detents 76 are not illustrated as being sectioned because they reside on a radial ring, which is better illustrated in FIG. 5. The detents 76 are radially spaced apart in that they form a plurality of peaks 76a and valleys 76b, i.e., a plurality of connected triangular shaped notches, which face axially towards the cam 72 of the slide 58. That is, they face in a direction parallel to the center line of the knob 52 The peaks 76a and valleys 76b include being rounded, chamfered or filleted as desired. The rounding or chamfering of the peaks 76a and the rounding or filleting of the valleys 76b are also factors leading to the overall tactile sensation that the driver feels as the driver rotates the knob 52 and sets different wiper speeds.

The valleys or bottoms of the notches of the detents 76 are preferably each at a slightly different axial distance (exaggerated for illustration) from the catch 70, so that the cam 72 rests at a slightly different axial distance from the catch 70, depending upon which detent 76 that the cam 72 engages. Thus, the axial force generated by spring 64 is different for each detent location. Consequently, the torque required to alter the detent location setting also is different for each detent location. The cam 72 and the slide spring 66, which are necessary for the momentary wash contact as described in FIG. 2 perform a dual role and replace the extra detent plunger 18 and detent spring 20 of the known lever 10, as described below. When a driver rotates the knob 52, the knob engages and rotates a well known rotational contact slider 69. At certain points during the travel of the knob 52, a conductive member of the rotational contact slider 69 engages a particular set of traces 62 on the vertical leg of the substrate 54 and activates an automobile function, preferably a different windshield wiper speed or turn the windshield wiper off. It should be appreciated that the present invention includes configuring other windshield wiper layouts for the linear momentary contact slider 58 and the rotational maintained contact slider 69 or having the sliders control non-wiper functions such as lighting, turn signal or radio control functions.

Referring now to FIG. 5, a rear end sectional view taken through the knob 52 of the present invention illustrates that a detent ring 80 defines the axially facing peaks 76a and valleys 76b of the detents 76 of the present invention. The detent ring 80 is defined by an outer radius, which is preferably the inner wall 74 of the knob 52, and an inner radius 82, which is preferably integral to the inner wall 74. The difference between the outer and inner radii defines the thickness of the detents 76, which is preferably substantially the same as the thickness of the cam 72. In one embodiment, the knob 52 including the inner substantially cylindrical wall 74, the detent ring 80, the detents 76 of the ring, the knob spring mating surfaces 78 and other features not illustrated are all preferably integrally formed or molded as one solid piece. One skilled in the art should be familiar with obtaining the necessary tooling and with the injection molding or blow molding techniques for producing the knob 52.

Referring to both FIGS. 4 and 5, when the driver turns the knob 52 of the present invention clockwise or counterclockwise, as illustrated in FIG. 5, the cam 72 of the slide 58 engages a different detent 76, as illustrated in FIG. 4. The slide 58 constantly engages an end of the slide spring 66, which provides a constant compressive force on the cam 72, so that the cam "rides" along the dynamic profile created by the plurality of closely spaced detents 76 of the detent ring 80 of the knob 52. As stated above, the cam 72 and the slide spring 66 replace the extra detent plunger 18 and detent spring 20 of the known lever 10. That is, when the rotational slider 69 makes an electrical connection with one or more of the traces 62 of the vertical leg of the substrate 54, initiating an automobile function, the cam 72 simultaneously bottoms out or engages the valleys 76b of one of the detents 76. The simultaneous engagement temporarily locks the cam in place, wherein the automobile's vibration or movement of the steering column does not cause the knob 52 to rotate, so that the circuit remains closed and the function continues. The simultaneous engagement also provides tactile feedback to the driver, which informs the driver that a particular automobile function has been set.

As described above, the shape of the cam 72 as well as the shape of the detents 76, including the peaks 76a and valleys 76b of the detents 76, are factors leading to the overall tactile sensation that the driver feels as the driver rotates the knob 52 and sets different wiper speeds. Additionally, the spring rate or spring constant of the slide spring 66, both of which define in general the amount of force necessary to compress a spring a unitary distance, is a factor leading to the driver's overall tactile sensation. Further, the loading of the spring, i.e., the average distance that the slide spring 66 is compressed when the spring 66 is set in place, is a factor leading to the driver's overall tactile sensation. That is, the more the spring 66 is compressed upon assembly, the more force that the spring applies to the slide 58 and the cam 72, which would result in requiring a greater torsional force from the driver to rotate the knob 52. Other factors, such as the inherent surface friction of the materials used for the detents 76 and the cam 72 may also have a small contribution to the driver's overall tactile sensation. Mechanical advantage provided by the knob 52 and relatively non-stiff spring rates easily enable the driver to break the temporary locking force of the detent spring 66.

It should be understood that various changes and modifications to the presently preferred embodiments described herein will be apparent to those skilled in the art. Such changes and modifications may be made without departing from the spirit and scope of the present invention and without diminishing its attendant advantages.

What is claimed is:

1. A steering column lever comprising:

a hollow knob having an inner wall that defines a plurality of axially disposed detents;

a first slide adapted for translational movement having a cam at one end adapted to engage one of the detents; and a substrate supporting translational movement of the first slide, the substrate having a trace adapted to engage a conductive member of a second slide to form an electrical connection, wherein one of the detents maintains the electrical connection.

2. The lever of claim 1, wherein the first slide includes a conductive member and the substrate includes a trace adapted to engage the conductive member of the first slide.

3. The lever of claim 2, wherein an electrical connection between the conductive member of the first slide and its associated trace initiates a windshield wash.

4. The lever of claim 2, wherein an electrical connection between the conductive member of the first slide and its associated trace is formed by translating at least a portion of the knob.

5. The lever of claim 1, wherein the electrical connection created by the second slide initiates a windshield wipe.

6. The lever of claim 1, wherein the electrical connection created by the second slide is formed by rotating at least a portion of the knob.

7. The lever of claim 1, wherein one detent receives the cam at a different axial position than does another detent.

8. The lever of claim 1, including a spring contacting the knob, the spring adapted to oppose manual translational movement of the knob.

9. The lever of claim 1, including a spring contacting the first slide at an end opposite the cam, the spring adapted to compress the cam into the detents of the knob.

10. The lever of claim 9, wherein the spring has a characteristic spring constant adapted to provide a predetermined resistance to rotational movement of the knob.

11. The lever of claim 9, wherein the spring is compressed, upon assembly, so as to provide a predetermined resistance to rotational movement of the knob.

12. The lever of claim 1, wherein the cam has a shape adapted to provide a predetermined resistance to rotational movement of the knob.

13. The lever of claim 1, wherein a detent is a notch in the inner wall having a shape adapted to provide a predetermined resistance to rotational movement of the knob.

14. A steering column lever comprising:

a hollow knob having an inner wall that defines a plurality of axially disposed detents;

a first slide adapted for translational movement having a cam at one end adapted to engage one of the detents; and a substrate supporting translational movement of the first slide, the substrate having a trace adapted to engage a conductive member of a second slide to form an electrical connection, wherein one of the detents provides tactile feedback for the electrical connection.

15. The lever of claim 14, wherein the substrate has a plurality of traces adapted to individually engage the conductive member of the second slide to form a plurality of individual electrical connections.

16. The lever of claim 15, wherein a particular detent provides tactile feedback for one of the electrical connections.

17. The lever of claim 15, wherein a particular electrical connection is created by rotating the knob such that the cam engages a particular detent.

* * * * *